April 3, 1962  L. V. WILSON, JR., ET AL  3,028,375
REMOVAL OF SOLIDS FROM POLYMER SOLUTION
Filed June 3, 1957
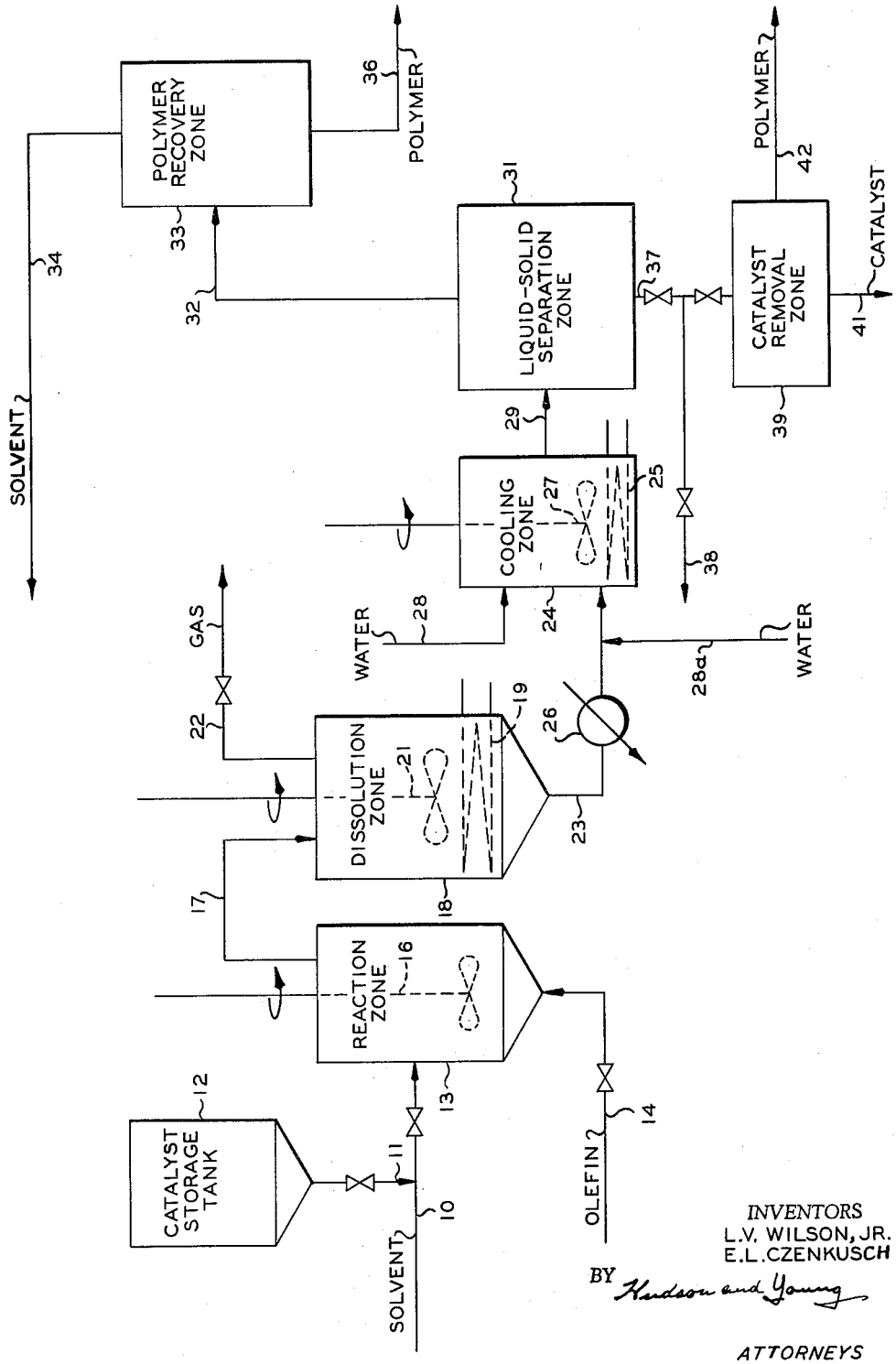
INVENTORS
L.V. WILSON, JR.
E.L. CZENKUSCH
BY Hudson and Young
ATTORNEYS 3,028,375
REMOVAL OF SOLIDS FROM
POLYMER SOLUTION
Lawrence V. Wilson, Jr., and Edward L. Czenkusch, Bartlesville, Okla., assignor to Phillips Petroleum Company, a corporation of Delaware
Filed June 3, 1957, Ser. No. 663,219
12 Claims. (Cl. 260—94.9)

This invention relates to the removal of solids from polymer solutions. In one aspect, it relates to a process for separating suspended solid catalyst from polymer solutions.

Various methods are described in the literature for producing normally solid and semisolid polymers. For example, hydrocarbons, such as ethylene, propylene, isobutene, butadiene, and styrene, can be polymerized, either independently or in various admixtures with one another, to produce solid and semi-solid polymers. Recently, considerable attention has been directed to the production of solid polymers of ethylene and/or propylene. The polymerizations are frequently carried out in the presence of solid catalysts, utilizing a liquid solvent as the reaction medium. As a result, the polymers recovered from the reactions are often in the form of solutions thereof in liquid solvents, which contain suspended particles of solid catalyst. For many uses, e.g., food containers, bottles, pipe capable of withstanding high pressures, and protective coatings, it is necessary that the polymers have a low ash content. It becomes important, therefore, to provide a method whereby substantially all of the solid catalysts can be removed from the polymer solution. A process for producing this desirable result is disclosed and claimed in copending U.S. patent application Serial No. 572,310, filed March 19, 1956, by G. E. Hanson and L. B. Croley, now U.S. Patent 2,930,784. The instant invention resides in an improvement in the process described in the Hanson and Croley application.

It is an object of this invention to provide a process for removing solids from polymer solutions.

Another object of the invention is to provide a process for separating suspended solid catalyst from polymer solutions.

A further object of the invention is to provide a process for producing polymers which have a low ash content.

Other and further objects and advantages of the invention will become apparent to those skilled in the art upon consideration of the accompanying disclosure and the drawing which is a flow diagram illustrating a preferred embodiment of the invention.

The invention described in the above-mentioned Hanson and Croley patent application resides in a process for removing suspended solids from a solution of a normally solid polymer in a solvent. The process broadly comprises cooling the polymer solution to a temperature at which a minor amount of the polymer precipitates from solution, thereby agglomerating the suspended solids, and then separating from the solution a mixture of precipitated polymer with at least a portion of the solids. It has now been found that at least part of the solids sometimes adheres to the walls of the heat exchanger in which the polymer is cooled and to the stirring means when used in conjunction with the heat exchanger. When this occurs, the heat exchanger and its associated stirring means are soon rendered inoperative. While it is not intended that the instant invention should be limited by any particular theory, one possible explanation is that an electrostatic effect in some cases prevents the solid particles from agglomerating.

We have now discovered a method for removing suspended solids from a solution of a normally solid polymer in a solvent in which it is possible to obtain in all instances the desired agglomeration of solid particles. Broadly speaking, the process of the instant invention comprises cooling the polymer solution to which a small amount of water has been added to a temperature at which a minor proportion of the polymer precipitates from solution, thereby agglomerating the suspended solids, separating from the solution a mixture of precipitated polymer with at least a portion of the solids. The addition of water is believed to compensate for the electrostatic effect, thereby permitting the solids and adhering polymer to agglomerate.

In a more specific embodiment of the instant invention, the polymer solution containing suspended catalyst and a small amount of water is cooled in a cooling zone to a temperature between zero and 50° F., preferably between 10 and 25° F., above the lower cloud point of the polymer solution. It is preferred to add an amount of water which is insufficient to form a separate water phase. Generally, an amount of water in the range of 2 to 100 percent by weight of the catalyst present in the polymer solution is sufficient, although larger amounts can be used so long as a separate water phase is not formed. The water can be added to the polymer solution in the cooling zone, or it can be added to the polymer solution prior to its introduction into that zone. Sufficient agitation is provided in the cooling zone to prevent the polymer, which precipitates as a result of the cooling, from settling. The resulting slurry of catalyst and solid polymer is then passed to a liquid-solid separation zone wherein a substantially catalyst free solution containing a major proportion of the polymer product is recovered. The recovered polymer solution is thereafter passed to a suitable polymer recovery zone. The solids recovered from the liquid-solid separation zone may be either discarded or passed to subsequent treatment for the recovery of the polymer and any adhering solvent.

The polymer in precipitating out of the polymer solution is believed to adhere to the small catalyst particles which agglomerate, thereby forming larger size particles. The agitation of the polymer solution in the cooling zone in addition to preventing the precipitated polymer from settling therein causes the particles with adhering polymer to contact one another, thereby assisting in the agglomeration of the catalyst particles. When practicing the process of this invention, it is generally preferred to cool the polymer solution only enough to precipitate the amount of polymer necessary to cause agglomeration of the catalyst particles. It is desirable to precipitate only a minimum amount of polymer in order to obviate subsequent treatment of a large amount of catalyst-containing precipitated polymer. In some cases it is possible to obtain a polymer product of acceptable ash content by precipitating such a small amount of polymer that it is more economical to discard the precipitated polymer than to treat it to remove the catalyst.

As is well known, a polymer of a certain average molecular weight is composed of a number of polymers having higher and lower molecular weights. For example, a polymer having an average molecular weight of 50,000 may contain some polymer of a molecular weight as low as 1,000 as well as polymer of a molecular weight as high as 200,000. At a temperature slightly above that at which most of the polymer in a polymer solution precipitates, there is a temperature region in which some of the higher molecular weight polymer precipitates. The temperature range of this region will vary with the particular solvent used and the molecular weight distribution of the polymer solution, but generally it will be between zero and 50° F., above the lower cloud point of the polymer solution.

The concept of cloud point and methods of determining cloud points are well known in the art of hydrocarbon chemistry. Thus, a homogeneous mixture of two or more components can be cooled to a particular temperature at which the appearance of a separate phase, enriched with respect to at least one of the components, is reached. The temperature at which the appearance of such a phase is noted is generally termed the "cloud point," since it is detected by the appearance of turbidity or precipitation.

The lower cloud point of a solution of any particular polymer in a hydrocarbon solvent depends on the particular hydrocarbon, the nature of the polymer, the concentration of polymer in the hydrocarbon, the molecular weight of the polymer, and other factors, so that a definite temperature applicable to all solutions of polymer in hydrocarbons cannot be stated with complete accuracy. Nevertheless, the lower cloud point of any particular polymer-hydrocarbon mixture can be readily determined by those skilled in the art by mere routine test, which comprises heating the particular mixture to a temperature at which a single homogeneous liquid solution or phase, as detected by visual observation, is obtained, and slowly cooling this solution until cloudiness, which indicates the formation of a second phase, is detected. The temperature at which the cloudiness appears is the lower cloud point. Thus, it has been found that isooctane (2,2,4-trimethylpentane) containing 3 weight percent ethylene polymer (40,000 molecular weight) has a lower cloud point of about 188° F., isooctane containing 5.2 weight percent ethylene polymer (40,000 molecular weight) has a lower cloud point of about 196° F., and isooctane containing 13.2 weight percent ethylene polymer (47,000 molecular weight) has a lower cloud point of about 202° F. In the case of cyclohexane, a solution containing 5 weight percent ethylene polymer (48,000 molecular weight) has a lower cloud point of about 188° F., while a solution containing 10 weight percent of the same polymer has a lower cloud point of about 189° F. The ethylene polymer was prepared by polymerizing ethylene in the presence of a chromium oxide-silica-alumina catalyst.

As indicated hereinabove, the polymer solution being treated in accordance with the instant invention is cooled to a point somewhat above the lower cloud point, in order to precipitate only a minimum amount of polymer. It is to be understood that some precipitation occurs above the lower cloud point even though this phenomenon cannot be detected by visual observation. The accuracy of the lower cloud point determination can be increased in many cases by the use of an instrument such as a nephelometer, a photometer, or any other suitable instrument which measures the light absorption or the scattering effect produced by the precipitation of additional solid or liquid in a mixture. Such instruments are well known in the analytical and instrumental control arts.

The present invention is broadly applicable to the separation of solid materials from solutions of polymers in any type of solvent. However, the invention is especially applicable to the separation of suspended catalyst from solutions of polymers obtained according to the copending patent application of Hogan and Banks, Serial Number 476,306, filed December 20, 1954, now abandoned, a continuation in part having issued as U.S. Patent 2,825,721. As set forth in this application in more detail, unique polymers and copolymers can be produced by contacting one or more olefins with a catalyst comprising, as an essential ingredient, chromium oxide, preferably including a substantial amount of hexavalent chromium. The chromium oxide is ordinarily associated with at least one other oxide, particularly at least one oxide selected from the group consisting of silica, alumina, zirconia, and thoria. One satisfactory method for producing the catalyst comprises the use of a steam-aged commercial cracking catalyst comprising a coprecipitated gel containing approximately 90 weight percent silica and 10 weight percent alumina. Such a gel is impregnated with an aqueous solution of a chromium compound ignitable to chromium oxide. Examples of such compounds are chromium trioxide, chromium nitrate, chromium acetate, and ammonium chromate. The composite resulting from the impregnation step is dried and then contacted for a period of several hours at a temperature of from about 450 to 1500° F., preferably from about 900 to about 1000° F., for example, with a stream of a substantially anhydrous oxygen-containing gas, such as air. The olefin feed used for the polymerization is at least one olefin selected from the class of 1-olefins having a maximum chain length of 8 carbon atoms and no branching nearer the double bond than the 4-position. Examples of such olefins are ethylene, propylene, 1-butane, 1-pentene, and 1,3-butadiene. Copolymers, such as ethylene-propylene copolymers and ethylene-butadiene copolymers, can be prepared by the described method. The polymerization can be effected at a temperature in the range 150 to 450° F. The pressure can range from approximately atmospheric to a high as 1000 p.s.i.

A satisfactory method of conducting the polymerization comprises contacting an olefin with a slurry of catalyst in a hydrocarbon solvent which can exist as a liquid at the temperature of polymerization. In such a case, the reaction pressure need only be sufficient to maintain the solvent substantially in the liquid phase and will ordinarily range from about 100 to about 700 p.s.i. When a solvent is so used, the reaction effluent comprises a mixture of solvent and polymer and contains finely divided suspended catalyst. A method for separating the catalyst from the reaction effluent is necessary if a polymer product of acceptable ash content is to be produced.

Suitable solvents for use in the above described process are hydrocarbons which are liquid and chemically inert under the reaction conditions. Solvents which can be advantageously used include paraffins, such as those having from 3 to 12, preferably from 7 to 9, carbon atoms per molecule, for example, 2,2,4-trimethylpentane (isooctane), normal hexane, normal decane, isopentane, and the like. Another class of solvents which can be used are naphthenic hydrocarbons having from 5 to 6 carbon atoms in a naphthenic ring and which can be maintained in the liquid phase under the polymerization conditions. Examples of such naphthenic hydrocarbons are cyclohexance, cyclopentane, methylcyclopentane, methylcyclohexane, ethylcyclohexane, the methyl ethyl cyclopentanes, the methyl propyl cyclohexanes, and the ethyl propyl cyclohexanes. The described class of naphthenic hydrocarbons includes condensed ring compounds such as decalin and the alkyl derivatives thereof. A preferred subclass of naphthenic hydrocarbons within the above-defined general class is constituted by those naphthenic hydrocarbons having from 5 to 6 carbon atoms in a single ring and from 0 to 2 methyl groups as the only constituents on the ring. Thus, the preferred naphthenic hydrocarbon solvents are cyclopentane, cyclohexane, methylcyclopentane, methylcyclohexane, the dimethylcyclopentanes, and the dimethylcyclohexanes. While it is preferred to use the above-described solvents, aromatic hydrocarbons, e.g., benzene, toluene, xylenes and the like, can also be utilized.

A more complete understanding of the invention may be obtained by referring to the drawing, which is a flow diagram illustrating a preferred embodiment of the invention. While the invention will be discussed with relation to the polymerization of ethylene using a chromium oxide-containing catalyst with cyclohexane as the solvent, it is to be understood that it is not intended to limit the invention to any particular polymerization process. As previously indicated, the invention is broadly applicable to the separation of solids materials from solution of polymer in any suitable solvent.

As shown in the drawing, a suitable solvent, such as cyclohexane, enters the system through inlet line 10. A catalyst, which has a particle size in the range from about 40 to about 100 mesh, is added to the solvent by means of line 11 connecting catalyst storage tank 12 to line 10. The slurry of catalyst in solvent which is thus formed is then pumped into reactor 13. The catalyst can be, for example, a chromium oxide-silica-alumina catalyst prepared by impregnating a 90 weight percent silica and 10 weight percent alumina gel composite with chromium trioxide, drying, and heating in air to obtain a catalyst composition containing approximately 2.5 weight percent chromium in the form of chromium oxide of which approximately half is in the form of hexavalent chromium.

An olefin, such as ethylene, enters the system through inlet line 14 and is intimately contacted with the catalyst slurry in reactor 13. A suitable stirring means 16, driven by a motor (not shown), is provided to facilitate contacting and to maintain the catalyst in suspension in the reaction mixture. The reaction zone can be maintained, for example, at 275° F., and 500 p.s.i. with the reaction time ranging from about 15 minutes to about 10 hours. The reactor effluent, which is withdrawn through line 17, comprises a mixture of polymer, solvent, suspended catalyst, and small amounts of unreacted ethylene. Additional solvent can be added to line 17, if desired, in order to obtain a mixture having a suitable viscosity for transfer through the system. The concentration of polymer is ordinarily adjusted to a value in the range from about 1 to about 15 weight percent, based on polymer plus solvent. The resulting mixture is passed into dissolution zone 18 wherein the mixture is heated by a heating means, such as heating coil 19, and agitated by means of stirring means 21 to ensure complete solution of polymer in the solvent. The dissolution zone is generally maintained at a temperature from 25 to 50° F. higher than reactor 13, a suitable temperature ordinarily being approximately 300 to 325° F. The pressure in dissolution zone 18 is ordinarily lower than that in reactor 13, for example, about 75 to 150 p.s.i. lower, but is still high enough to maintain the solvent in liquid phase. The increased temperature and the reduced pressure can be utilized to remove any unreacted ethylene or other gas, which can be withdrawn through outlet line 22.

The resulting solution containing suspended catalyst is removed from dissolution zone 18 by means of line 23 and then passed into cooling zone 24. Cooling zone 24 is provided with a suitable cooling means, such as cooling coil 25. It is also within the scope of the invention to effect the desired cooling in the cooling zone by direct heat exchange means rather than indirect means as shown, such as by the addition of cold solvent to the cooling zone. If desired, a cooler 26 may be provided in line 23 in order to accomplish a partial cooling of the polymer solution prior to its introduction into the cooling zone. In the cooling zone, the polymer solution is cooled to a temperature sufficient to cause precipitation of a minor proportion of the polymer in solution. The solution in the cooling zone is continuously agitated by stirring means 27 so as to prevent settling of the precipitated polymer. As previously indicated, the temperature at which it is desired to operate the cooling zone is, in general, between zero and 50° F. above the lower cloud point of the particular polymer solution being treated. It has been found that when operating in this temperature range, about 1 to 15 percent of the polymer in solution is caused to precipitate. The polymer in precipitating adheres to the finely divided catalyst suspended in the polymer solution. As hereinbefore discussed, it has been found that sometimes the catalyst particles coated with polymer tend to accumulate on the heat exchange surfaces and of the stirrer. It has now been discovered that the addition of a small quantity of water, e.g., from 2 to 100 weight percent of the catalyst present, to the polymer solution allows the desired agglomeration to take place in all cases. In order to obtain this desirable result, it is necessary that the water be present in the polymer solution at the time the polymer commences to precipitate. Line 28 attached to cooling zone 24 provides means for introducing water into the polymer solution contained in this zone. It is also within the scope of the invention to add the water to the polymer solution prior to its introduction into the cooling zone. For example, water can be added to the polymer solution flowing in line 23 by means of line 28a. Addition of the water prevents the catalyst particles containing polymer from adhering to the walls of the cooling zone and the stirring means, thereby permitting them to agglomerate and form larger size particles. The agglomeration of the particles is assisted by the stirring of the polymer solution, which causes the catalyst particles and adhering polymer to contact one another.

The resulting slurry of solid polymer and catalyst is removed from the cooling zone through line 29 and passed into liquid-solid separation zone 31. This zone may be a settling tank, a cyclone separator, a centrifuge, a filter, or other suitable means for accomplishing the separation of a liquid from solids. An essentially catalyst-free solution containing a major proportion of the polymer product is recovered from separation zone 31 by means of line 32 and passed to polymer recovery zone 33. Zone 33 can be any suitable means for recovering polymer from a solution thereof in a solvent and can comprise, for example, a series of evaporation steps as described in more detail in the copending application of Martin R. Cines, Serial No. 496,515, filed March 24, 1955. The zone can also comprise cooling and filtration equipment whereby the dissolved polymer is precipitated from solution by cooling the solvent to a temperature below the lower cloud point and subsequently filtering. Solvent recovered from zone 33 through line 34 can be recycled to line 10. A polymer, which may have a lower average molecular weight than that of the total polymer produced in reaction zone 13, is recovered through outlet line 36. This polymer preferably has a molecular weight only slightly lower than that of the total polymer produced, and this is accomplished, as previously described, by precipitating in cooling zone 24 only a minimum of polymer which will have a very high molecular weight as compared to that of the total polymer produced. It is also within the scope of the invention to utilize a filter, such as a cartridge-type filter, in line 32 in order to effect the removal of catalyst which may still remain in the polymer solution recovered from zone 31. The use of a cartridge-type filter in this line is made possible by the fact that substantially all of the solid material has been separated from the solution in zone 31.

Referring again to liquid-solid separation zone 31, the separated phase containing most of the suspended catalyst is withdrawn through line 37. If desired, this stream can be removed from the system through line 38 and either discarded or utilized in applications in which the presence of catalyst is not deleterious. For example, it may be used in the fabrication of pipe which will not be subjected to high pressures. Alternatively, the separated polymer phase can be passed to catalyst removal zone 39 wherein the polymer can be dissolved in any suitable solvent, the catalyst separated therefrom by filtration, centrifugation, or other suitable means, and then removed through outlet 41. The polymer which is recovered from catalyst removal zone 39 through line 42 has a far higher molecular weight than the total polymer produced in the polymerization reaction. In the separation of the catalyst from the polymer phase in catalyst removal zone 39, the volume of polymer solution is ordinarily small as compared to the volume of the reactor effluent. As a result, the load on the solids removal zone is considerably less than would be the case if a similar zone were used to remove the catalyst from the reactor effluent. Instead of treating the polymer phase in catalyst removal zone 39 as indicated above, the catalyst can be separated therefrom by dissolving the polymer in a solvent and thereafter treating the polymer solution in a cooling zone and a liquid-solid separation zone as described in conjunction with the drawing.

A more complete understanding of the invention can be obtained by referring to the following illustrative example which is not intended, however, to be unduly limitative of the invention.

*Example*

A solution of polyethylene in toluene containing suspended catalyst particles was present in a beaker. The solution was at a temperature of about 230° F., and there was an excess of toluene over that required to dissolve the polymer. The polyethylene was produced by polymerization of ethylene in the presence of a 40 to 100 mesh catalyst prepared by impregnating a 90 weight percent silica-10 weight percent alumina coprecipitated gel composite with an aqueous solution of chromium trioxide, drying, and heating for several hours in a stream of anhydrous air at about 950° F. The polymerization was conducted at a temperature in the range of about 280 to 300° F. and at a pressure of about 450 p.s.i.g.

The polymer solution containing dispersed catalyst was air cooled while stirring to about 200° F. and then to about 190° F., the latter temperature being approximately equal to the lower cloud point of the solution. It was noted that catalyst particles with adhering polymer has formed on the walls of the beaker and on the stirrer. Thereafter, from about 5 to 10 drops of water were added to the beaker after which the materials contained therein were heated to approximately 230° F. The resulting polymer solution containing suspended catalyst was then air cooled while stirring to about 200° F. The catalyst particles and adhering polymer now agglomerated at this temperature, forming larger size particles which upon termination of the stirring settled to the bottom of the beaker. The polymer solution substantially free of catalyst was then recovered from the beaker by decantation.

From the foregoing it is seen that when a small amount of water was added to the polymer solution, the agglomeration of catalyst particles necessary to obtain the desired separation occurred. Furthermore, there was then no deposition of catalyst and adhering polymer on the beaker walls and stirrer.

It will be apparent to those skilled in the art that variations and modifications of the invention can be made from a study of the foregoing disclosure. Such variations and modifications are believed to be clearly within the spirit and scope of the invention.

We claim:

1. A process for removing suspended catalyst from a solution of normally solid polymer in a hydrocarbon solvent which comprises adding water to said solution, the amount of water added being such that only one liquid phase is present; cooling said solution containing containing water in a cooling zone to a temperature between zero and 50° F. above the lower cloud point of said solution; continuously agitating said solution during said cooling; passing a resulting slurry of solid polymer and catalyst in polymer solution into a separation zone; and recovering from said separation zone a substantially catalyst-free polymer solution.

2. The process according to claim 1 wherein the amount of water added to said solution is between about 2 and 100 weight percent, based on the amount of catalyst in said solution.

3. A process for treating a polymer prepared by the catalytic polymerization of ethylene in admixture with at least one hydrocarbon selected from the group consisting of normally liquid paraffins, naphthenes and aromatics in the presence of a catalyst comprising a minor amount of chromium in the form of chromium oxide, and containing a substantial amount of hexavalent chromium, associated with at least one oxide selected from the group consisting of silica, alumina, zirconia, and thoria, which comprises adding water to a solution of ethylene polymer in said hydrocarbon, said solution containing suspended catalyst, the amount of water added being between 2 and 100 weight percent of said suspended catalyst; cooling said solution to a temperature at which a minor proportion of the polymer precipitates from solution, thereby agglomerating said suspended catalyst; and separating from said solution a mixture of precipitated polymer with at least a portion of said catalyst.

4. A process according to claim 3 wherein said solution is cooled to a temperature between zero and 50° F. above the lower cloud point of said solution and said solution is continuously agitated during said cooling.

5. A process according to claim 3 wherein said hydrocarbon is a paraffin having from 7 to 9 carbon atoms per molecule.

6. A process according to claim 3 wherein said hydrocarbon is a naphthene having from 5 to 6 carbon atoms in a naphthenic ring.

7. A process according to claim 3 wherein said hydrocarbon is an aromatic hydrocarbon.

8. A process according to claim 3 wherein said hydrocarbon is 2,2,4-trimethylpentene.

9. A process according to claim 3 wherein said hydrocarbon is cyclohexane.

10. A process according to claim 3 wherein said hydrocarbon is toluene.

11. A process for removing suspended catalyst from a solution of normally solid polymer in a hydrocarbon solvent which comprises adding water to said solution, the amount of water added being such that only one liquid phase is present; cooling said solution to a temperature at which a minor proportion of the polymer precipitates from solution, thereby agglomerating said suspended catalyst; and separating from said solution a mixture of precipitated polymer with at least a portion of said catalyst.

12. The process according to claim 11 wherein said polymer is a polymer of ethylene.

References Cited in the file of this patent

UNITED STATES PATENTS

| | | |
|---|---|---|
| 2,699,457 | Ziegler | Jan. 11, 1955 |
| 2,710,854 | Seelig | June 14, 1955 |
| 2,731,452 | Field et al. | Jan. 17, 1956 |
| 2,825,721 | Hogan et al. | Mar. 4, 1958 |
| 2,858,902 | Cottle | Nov. 4, 1958 |
| 2,886,561 | Reynolds et al. | May 12, 1959 |

OTHER REFERENCES

Chemical Engineers' Handbook (Perry), published by McGraw-Hill, (1949). (Page 1004 relied on.)